Patented Oct. 9, 1945

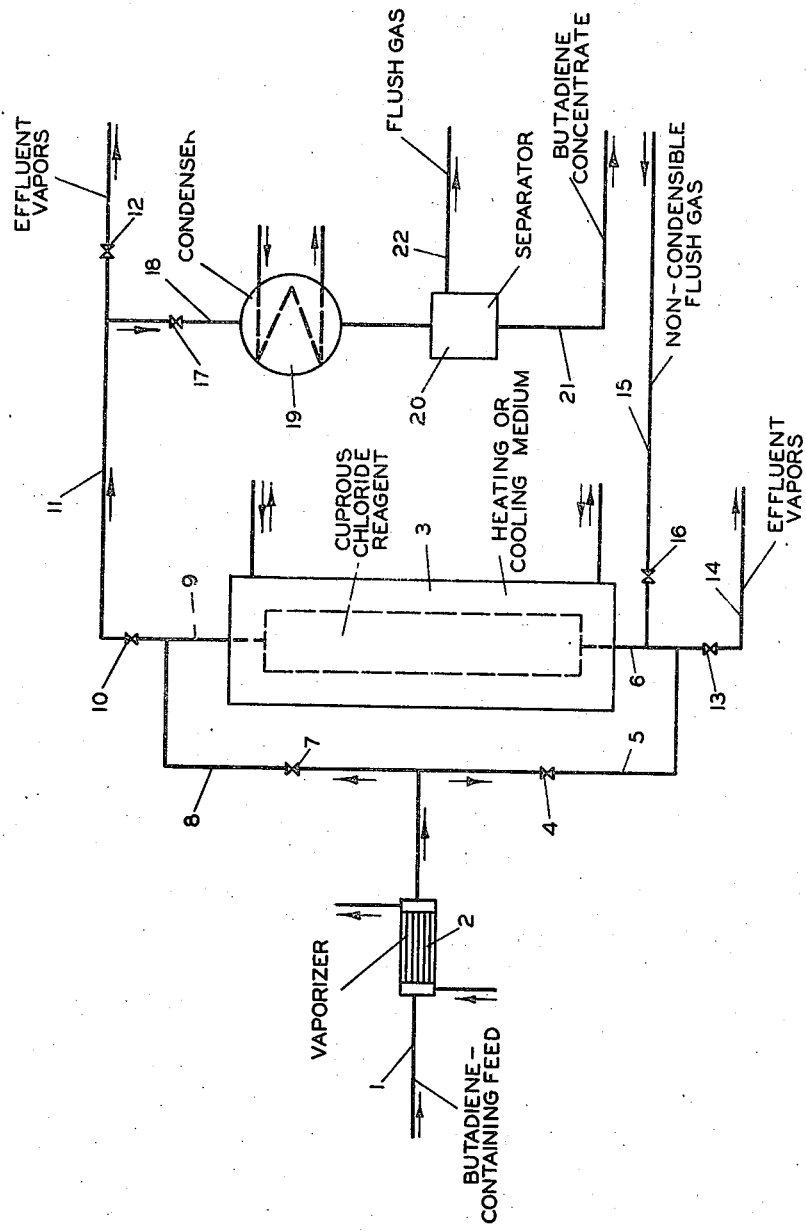

2,386,274

UNITED STATES PATENT OFFICE 2,386,274

PROCESS AND REAGENT FOR THE SEPARATION OF DIOLEFINS

Graham H. Short and Lloyd C. Morris, Bartlesville, Okla., assignors to Phillips Petroleum Company, a corporation of Delaware Application August 23, 1941, Serial No. 408,078

11 Claims. (Cl. 260—680)

This invention relates to the treatment of low-boiling hydrocarbon mixtures containing a diolefin for the separation and recovery of the diolefin. More specifically it relates to the separation and recovery of butadiene from hydrocarbon fluids by means of chemical reagents, particularly metal salt reagents which form addition compounds with butadiene through a thermally-reversible addition reaction.

The various processes for the manufacture of diolefins such as butadiene, almost without exception yield primary mixtures comprising diolefins and the corresponding mono-olefins and paraffins in which the diolefin may be only a relatively minor constituent. The concentration of the diolefin in such a mixture usually depends on the particular manufacturing process and on the extent to which conventional methods of segregation including fractionation isolate the desired product. However, the final purification necessary to produce the diolefin concentrations demanded by many utilizations may often exceed the selectivity of conventional separation methods.

In general, the recovery of substantially pure diolefins from complex mixtures of the type described requires the use of selective solvents or chemical reagents of such specificity that the other components of the mixture are rejected or are unreacted. The intermediate reaction product with chemical reagents may be a diolefin addition compound which is sufficiently unstable to permit complete diolefin recovery by convenient means.

Certain diolefins including butadiene react with salts of the univalent form of metals of groups I and II of the periodic table to form loose addition compounds, and cuprous halides are particularly reactive. The use of aqueous solutions of cuprous halides, and particularly the chloride, has been proposed although the reaction under these conditions is not specific for butadiene and difficulty is experienced in excluding the mono-olefins and acetylenes which may be retained by the solutions. The purity of the butadiene recovered depends largely upon the completeness with which the solid butadiene-cuprous chloride product can be separated from the aqueous medium prior to desorption.

More recently, in the co-pending patent application of Walter A. Schulze, John C. Hillyer, and Harry E. Drennan, Serial Number 354,086, filed August 24, 1940, there have been described certain solid-type cuprous halide reagents for separating diolefins from hydrocarbon mixtures. These solid reagents comprise adsorbent carriers impregnated with the metal salt, and have the advantage of being non-corrosive and less susceptible to oxidation. These reagents may be used with either liquid or gaseous hydrocarbon mixtures and the diolefin is recovered from the addition product which is retained by the reagent. While the processes utilizing these solid impregnated reagents are quite satisfactory, the reagents exhibit a gradually increasing activity and capacity for diolefins with maxima obtained only after extended periods of use. Also on a weight basis, the relatively dense adsorbent carriers produce a very heavy reagent with relatively small percentage of active ingredient. Further, when liquid hydrocarbon mixtures are treated over these reagents, cuprous halide may be carried out in the effluent liquid so that after-treatment is required to remove same. This not only adds to the expense of the process but accounts for a gradual loss of the active ingredient from the reagent.

An object of this invention is to provide a novel method for the concentration of a diolefin from a mixture containing the same. Another object is to provide an improved reagent for use in said method. A further object is to provide a method of preparing a solid cuprous halide reagent for reaction with butadiene, said reagent being highly active and containing a high percentage of cuprous halide. These and other objects and advantages of our invention will be evident from the following disclosure.

We have now discovered a method of preparing solid metal salt reagents for use in the separation of diolefins which results in highly active reagents of greater metal salt content and greater capacity for diolefins. Furthermore, our reagents exhibit maximum activity from the first use and thus require no preliminary period of activation. We have further developed a process utilizing our improved reagent composition which eliminates after-treatment of the effluent hydrocarbons subsequent to the removal of diolefins and which produces substantially pure diolefin concentrates by a simplified desorption procedure.

We have found that in the removal of butadiene from hydrocarbon mixtures the removal reaction may be essentially complete in a relatively short period of contact with our highly active reagent. With our improved reagent composition we may, therefore, operate with a gaseous hydrocarbon feed stock without adversely affecting the completeness of diolefin removal. Thus, treating hydrocarbons in liquid phase in order to obtain longer contact or reaction time is not essential in our process. By being enabled to treat gaseous hydrocarbons we eliminate the removal of cuprous halide in solution in the hydrocarbons and are thus able to eliminate after-treatment to recover the metal salt.

Our solid reagent compositions preferably comprise dry powdered cuprous halide mechanically mixed with a non-adsorbent carrier which has been wet with a minor proportion of a high-boiling non-aqueous liquid substantially inert toward all other components of the reagent and of the hydrocarbon mixtures. Our preferred carriers are extremely light and porous in comparison with the metal salt, and the presence of the high-boiling liquid probably aids in bonding the carrier and the cuprous halide. Preferably the high-boiling liquid referred to is one which is substantially water insoluble and of an oleaginous character.

In the preparation of our reagent we have found that a granulated cellulosic fibrous material such as sawdust of suitable mesh size, for example that which will pass an eight or ten mesh screen and stop on a 20 or 30 mesh screen, is an excellent carrier from the standpoint of cost, availability and density. Other types of carriers such as expanded vermiculite and other non-adsorbent materials may be used but are more expensive and often less satisfactory. These carriers are preferably of such character as to have a light structure which permits loose packing, such structure being desirable in order to prevent packing during use and to provide sufficient contact surface for the metal salt.

We may use sawdust from various kinds of wood, but regardless of the kind, we have in most cases found it desirable first to extract the sawdust with solvents which remove the natural oils and/or resins which may be present and may interfere with the treating process. For example, with pine sawdust extraction by simple soaking with several volumes of acetone and/or benzene may be used, or the extraction is satisfactorily complete by washing with a hydrocarbon solvent such as pentane. After extraction, the drained sawdust is heated to drive out the solvent, ordinarily to about 150 to 180° F. It is believed that the extraction step described is advantageous since it may remove oily and resinous materials which appear to be reactive to some extent with the metal salt of the reagent or with components of the hydrocarbon mixtures being treated.

The extracted and dried sawdust is then sprayed or otherwise contacted with a suitable high-boiling oleaginous liquid, one function of which is to prepare the carrier to retain the powdered cuprous chloride. We have obtained excellent results with several materials including oils, such as lubricating oil, castor oil and other like materials which are substantially inert towards all components of the reagent and the hydrocarbon vapors to be treated, and are furthermore of high enough boiling point to undergo substantially no vaporization under the conditions used to desorb the butadiene. When using either lubricating oil or castor oil enough oil is sprayed onto the sawdust from an atomizing spray to amount to from about two to about six or eight or more per cent by weight of the finished reagent.

The sprayed oil-wet sawdust is then intimately mixed with dry powdered cuprous chloride by mechanical agitation to obtain a uniform cohesive mixture of high cuprous chloride content and of excellent permeability for vapor flow. Although the void space of the mixture is relatively small, the resistance to vapor flow is remarkably low. The amount of cuprous chloride added may vary rather widely with the upper limit being measured by the tendency of the salt to sift or settle from the reagent mass. In general terms, the cuprous chloride usually amounts to from less than 25 per cent to about 75 per cent by weight of the final reagent mixture with reagents containing 60 to 70 per cent being highly satisfactory from the standpoint of mechanical characteristics and capacity for absorbing butadiene.

The function of the oil in our reagent composition is somewhat obscure. The mechanical characteristics and uniform texture and composition of the reagent are greatly improved by the oil, as is the activity of the reagent within certain limits. The maximum benefits are obtained with relatively small amounts of the oil and larger amounts do not increase the activity, so it is indicated that the function is largely mechanical. In some cases, the liquid or oil may be regarded as a solvent for the hydrocarbon vapors in promoting contact between the butadiene and the cuprous chloride. However, we do not limit ourselves to such an explanation since castor oil which has substantially no solubility for hydrocarbons functions satisfactorily. Regardless of the mechanism, we have noted considerable benefits from the addition of oil or other suitable liquids to our reagent compositions.

In one specific embodiment of our process, a hydrocarbon gas mixture containing butadiene is passed at suitable flow rate and reduced temperature over a bed of reagent prepared as described above by mixing together powdered cuprous chloride and relatively fine mesh sawdust previously sprayed with a light lubricating oil. When a predetermined amount of butadiene is removed by the reagent, the gas flow is stopped, the reagent is freed of unreacted hydrocarbons, and the diolefin is recovered by heating to decompose the cuprous chloride-butadiene addition compound. A similar procedure may be followed in using halides other than the chloride, such as cuprous bromide.

The operation may be illustrated by the flow diagram of the drawing which shows one arrangement of apparatus for the process. In the drawing, the hydrocarbon feed containing butadiene enters through line 1 and passes through vaporizer 2 to vaporize liquid hydrocarbons. In case of a totally vaporous feed the vaporizer may be omitted or by-passed. The vapor then passes to reagent tower 3 through valve 4 and lines 5 and 6 for upward flow through the reagent. Alternately the flow may be through valve 7 and lines 8 and 9, and the flow may be changed at specified times, for example after desorption and before a new absorption cycle. The reagent tower 3 is comprised of a chamber for the reagent surrounded by a jacket through which a refrigerant may circulate during absorption and which may hold a heating fluid during desorption. The treated diolefin-denuded vapor exits through line 9, valve 10, line 11 and valve 12 or line 6, valve 13 and line 14.

When sufficient diolefin has been absorbed, the flow of butadiene-containing vapor is stopped by closing valve 4, and the refrigerant is removed from the outer jacket of tower 3. While the temperature rises in the reagent tower to levels below those causing desorption of the butadiene, unreacted hydrocarbon vapor is removed from the reagent space by passing a non-condensible flush gas through line 15, valve 16 and line 6. The vapors and flush gas pass out through line 9, valve 10, line 11, and valve 12. When unreacted vapors have been removed, the temperature is raised to levels which cause decomposition of the butadiene-cuprous chloride addition compound, valve 12 is closed and valve 17 is opened, and the butadiene is evolved and taken through line 9, valve 10, line 11, valve 17, and line 18 to condenser 19. The liquid formed therein then passes to separator 20 and is taken through line 21 to storage. If the flush gas is passed during the desorption, it leaves separator 20 through line 22.

Other methods of removing the unreacted vapor prior to desorption may be employed, such as evacuation. However, we ordinarily prefer to use a flush gas which is non-condensible and therefore easily sweeps out the heavier vapors.

While the drawing indicates one specific arrangement of apparatus, many modifications may be made. For example, with duplication of the necessary apparatus a continuous operation may be obtained. Or the effluent vapors may be condensed if desired or given a second treatment under special circumstances. Instead of external heating and cooling by a jacket, the heat exchange media may circulate through tubes within the reagent space, or the reagent itself may be placed in a number of small tubes within a bath. These and other modifications are possible within the scope of our disclosure.

In the absorption cycle, the reagent is held at temperatures in the range of $-20$ to $+80°$ F. since the formation of the addition product is favored by these reduced temperatures. Ordinarily we prefer for economic reasons and for reasons connected with the dewpoint of the vapors being treated to work in a narrower portion of this range, say from 10 to 60° F. These temperatures may be obtained by any suitable refrigerant and the vapors may be pre-cooled by the vaporization step or by independent means before entering the reagent space. While our reagent has relatively good heat transfer qualities, we prefer to limit the distance through which heat transfer is accomplished by limiting the diameter of the reagent vessels or the distances between conduits carrying heat transfer media. Thus, we may limit the distance between cooling or heating surfaces in the reagent bed to relatively small values and in this manner increase the efficiency of our apparatus.

Pressures in our process are generally atmospheric or very low superatmospheric pressures of zero to five or ten pounds per square inch gage. In the absorption step, since the temperatures of operation may be near the dewpoint of the gas mixtures being treated, low pressures are obviously necessary to avoid condensation. In this respect our reagent is especially valuable since pressure drops through deep beds of the mixtures are remarkably low and vapor phase treating is feasible. This is an outstanding advantage of our new reagents over other types of reagents on adsorbent carriers or those such as asbestos and the like since the resistance to flow through the latter types ordinarily causes condensation at the preferred temperatures of absorption. We operate in the substantial absence of condensation or any measurable liquid phase since the composition of our reagents may be altered by displacement of the oil or other liquid additive especially when said oil or other liquid is appreciably soluble in the liquid hydrocarbons.

As indicated above, the direction of hydrocarbon vapor flow through the reagent may be either upward or downward as desired. However, in some instances, in order to eliminate any tendency toward packing and/or channeling of the reagent bed at high vapor rates, the direction of flow may be reversed between absorption cycles to equalize and offset any re-arrangement of the bed which might decrease treating efficiency.

Prior to the desorption cycle, the removal of unreacted hydrocarbon vapors, which is essential to butadiene purity in the range of 99 to 100 per cent, is possible at the temperature of absorption, but is much more rapid at higher temperatures of about 80 to 120° F. These temperatures permit a more rapid removal or withdrawal of unreacted vapors, but are too low to cause any desorption of butadiene from the reagent even if sub-atmospheric pressures are employed concurrently. Since our reagent is substantially non-adsorbent, the amount of unreacted material in the reagent space is relatively small and quickly removed. The passage of a flush gas is very helpful in this connection and is often to be preferred to evacuation. As the non-condensible flush gas we may use any available material substantially inert toward the reagent and the hydrocarbons and free of deleterious impurities.

For the desorption of the butadiene by decomposing the cuprous chloride addition compound, temperatures in the range of 140 to 210° F. or higher are required. The rate of desorption increases with increasing temperature or with decreasing pressure. In general we prefer to use temperatures of about 180 to 210° F. which give rapid evolution of butadiene at near-atmospheric pressures. However, lower temperatures in the stated range may be used in connection with sub-atmospheric pressures.

Flow rates in our process may be adjusted to values giving substantially complete absorption of butadiene or to any desired level of absorption. Ordinarily we prefer to maintain complete absorption for a reagent bed and switch to a freshly-desorbed bed when appreciable concentrations of butadiene appear in the treated vapors. Satisfactory flow rates under these conditions will vary with the butadiene content of the vapors to be treated, but with butadiene concentrations of one to fifty volume per cent or more we employ space velocities of about 100 to about 2000 gas volumes per hour per volume of reagent with narrower ranges of 100 to 1000 being preferred for very low or very high butadiene concentrations.

The following specific examples will serve further to illustrate our process without implying any limitation on its scope or application.

*Example I*

A $C_4$ hydrocarbon mixture containing about 16 volume per cent of butadiene along with butenes and some normal butane was vaporized and passed at a temperature of 35° F. and a space velocity of 400 gas volumes per hour per volume of reagent over a cuprous chloride reagent. The pressure on the gas entering the reagent tower was about one pound gage. The reagent consisted of 25 weight per cent of 8 to 30 mesh pine sawdust, 5 weight per cent of light lube oil and 70 weight per cent of cuprous chloride. The sawdust was previously washed with three volumes of normal pentane, dried at 150° F., and then sprayed with the oil. The oil-moist sawdust was then mixed in a tumbler-type mixer with the dry powdered cuprous chloride until a uniform composition was obtained. The reagent was placed in a series of tubes six inches in diameter and suspended in a cooling jacket through which water at ice temperature was circulated.

The absorption was continued as long as the removal of butadiene was essentially complete. The flow of butadiene-containing vapor was then stopped, and while water at 120° F. was circulated through the jacket, methane gas was passed slowly through the reagent space to sweep out unreacted butenes and butane. The methane gas supply from a relatively pure source was delivered under a pressure just above atmospheric. When a condensation test showed no further $C_4$ hydrocarbons in the methane issuing from the reagent, the temperature was raised to 190-200° F. by circulating a mixture of hot water and steam through the jacket on the reagent tower.

The methane flow was stopped and the pressure on the tower exit line was held at about atmospheric while the desorbed butadiene was led through a condenser and a separator where the liquid butadiene was collected. Near the end of the desorption, methane was again passed through the reagent and through the condenser and separator to sweep out the last of the butadiene.

The butadiene collected was over 98 per cent pure and the amount desorbed corresponded to over 95 per cent utilization of the cuprous chloride content of the reagent in forming the compounded $C_4H_6 \cdot (CuCl)_2$.

Substantially similar results were obtained in treating a $C_3$-$C_4$ gas mixture containing six volume per cent of butadiene over the same reagent composition. Treating conditions were identical except that the flow rate was lowered to correspond to a space velocity of 150 gas volumes per hour.

Example II

A reagent was prepared by spraying pentane-washed hardwood sawdust with castor oil. The sprayed material was then mixed with dry powdered cuprous chloride and the final mixture contained 65 weight per cent of cuprous chloride, 5 weight per cent of castor oil and the balance sawdust.

A $C_4$ gas mixture containing 25 volume per cent of butadiene was treated over this reagent at a temperature of 45° F. and a space velocity of 600 gas volumes per hour per volume of reagent. The pressure at the inlet of the reagent tower was about 1.5 pounds gage and substantially atmospheric at the outlet. When about 90 per cent of the theoretical quantity of butadiene (based on the cuprous chloride content of the reagent) had been absorbed the removal dropped below 95 per cent and the reagent was desorbed.

Unreacted hydrocarbon vapors were flushed from the reagent space by a slow stream of nitrogen gas while the reagent was warmed to about 120° F. The reagent was then heated to 200° F. while continuing the passage of nitrogen, and the desorbed butadiene was condensed and separated with a purity of over 98 per cent.

The hydrocarbon vapor mixtures to be treated by our process may be more or less closely fractionated mixtures comprising $C_3$ and $C_4$ hydrocarbons although such close fractionation is not essential in vapor phase treating. Higher-boiling hydrocarbons including $C_5$ paraffins, olefins and diolefins may be present in relatively minor amounts as long as condensation is substantially avoided. From an economic standpoint, preliminary segregation of stocks is desirable since equipment size and treating costs are lowered when non-reactive materials are separated prior to treatment.

The terms "absorption" and "desorption" as used herein are intended to designate the formation and the decomposition of the diolefin-cuprous chloride addition compound by the thermally reversible reaction described above.

We claim:

1. A process for the separation of butadiene from fluid mixtures containing the same which comprises contacting said mixtures in vapor phase with a reagent comprising a mixture of a cuprous halide and a granulated cellulosic fibrous material impregnated with a high-boiling oleaginous material substantially inert to the components of the reagent and the fluids being treated, and removing the unreacted vapors from the reagent space, whereby the butadiene is selectively removed from said mixtures.

2. A process for the separation of butadiene from hydrocarbon fluids containing the same which comprises contacting said fluids in vapor phase with a reagent comprising a mixture of cuprous halide and granular wood material of the nature of sawdust impregnated with a minor amount of a high-boiling non-aqueous substantially inert liquid whereby the butadiene is selectively absorbed, removing unreacted vapors from the reagent space at temperatures below those causing desorption of the butadiene, heating the resulting mass including the complex formed between the cuprous halide and the butadiene to temperatures sufficient to desorb the butadiene, and withdrawing and recovering the same in substantially pure form.

3. A process for the separation of butadiene from low-boiling hydrocarbon fluids containing the same which comprises contacting said fluids in vapor phase with a reagent comprising cuprous chloride and a granular wood material of the nature of sawdust substantially free of natural oil and resins and impregnated with a substantially inert oil whereby the butadiene is absorbed, removing the unreacted hydrocarbon vapor from the reagent space, and heating the resulting mass including the complex formed between the cuprous chloride and the butadiene to desorb the butadiene and recovering same.

4. A process for the separation of butadiene from low-boiling hydrocarbon fluids containing the same which comprises contacting said fluids in vapor phase with a reagent comprising cuprous chloride and a granular wood material of the nature of sawdust substantially free of natural oil and resins and impregnated with a high-boiling refined hydrocarbon oil whereby the butadiene is absorbed, removing the unreacted hydrocarbon vapor from the reagent space, and heating the resulting mass including the complex formed between the cuprous chloride and the butadiene to desorb the butadiene and recovering same.

5. A process for the separation of butadiene from low-boiling hydrocarbon fluids containing the same which comprises contacting said fluids in vapor phase at temperatures in the range of about 10 to 60° F. with a reagent comprising cuprous chloride and a granular wood material of the nature of saw-dust substantially free of natural oil and resins and impregnated with a high-boiling refined substantially inert vegetable oil whereby the butadiene is absorbed, removing unreacted hydrocarbon vapors from the resulting mass including the complex formed between the cuprous chloride and the butadiene space, heating the reagent to temperatures sufficient to desorb the butadiene, and recovering the butadiene.

6. A process for the separation of butadiene from low-boiling hydrocarbon fluids containing the same which comprises contacting said fluids in vapor phase at temperatures in the range of 10 to 60° F. with a reagent comprising cuprous chloride intimately mixed with granular sawdust substantially free of natural oil and resin and impregnated with a minor proportion of a high-boiling refined mineral oil whereby the butadiene is absorbed, stopping the flow of butadiene-containing vapors into the reagent, removing unreacted vapors remaining in the reagent space at temperatures above those of the absorption step but below those causing desorption of butadiene while passing a non-condensible substantially inert gas through the reagent space, desorbing the butadiene by heating the resulting mass including the complex formed between the couprous chloride and the butadiene to temperatures in the range of 180 to 210° F., and recovering the butadiene.

7. A reagent for the vapor phase separation of butadiene from low-boiling hydrocarbon fluids containing the same which comprises dry powdered cuprous halide intimately mixed with a granular cellulosic material impregnated with a high-boiling oleaginous material inert to the other components of the reagent and the fluids being treated.

8. A reagent for the vapor phase separation of butadiene from low-boiling hydrocarbon fluids containing the same which comprises dry powdered cuprous chloride intimately mixed with a granular wood material of the nature of sawdust previously treated for the removal of extractable natural oil and resins and impregnated with a minor proportion of a high-boiling refined mineral oil.

9. A reagent for the vapor phase separation of butadiene from low-boiling hydrocarbon fluids containing the same which comprises dry powdered cuprous chloride intimately mixed with a granular wood material of the nature of sawdust previously treated for the removal of extractable natural oil and resins and impregnated with a minor proportion of a substantially inert vegetable oil.

10. A process for the separation of butadiene from low-boiling hydrocarbon fluids containing the same which comprises contacting said fluids at temperatures in the range of 10 to 60° F. and near-atmospheric pressures with a reagent comprising dry powdered cuprous chloride and sawdust, said sawdust having been previously treated for the removal of extractable natural oil and resin and impregnated with a minor proportion of a high-boiling mineral oil, whereby the butadiene is absorbed, removing unreacted vapors from the reagent space during passage at atmospheric pressure of a non-condensible inert gas therethrough at temperatures below those causing desorption of the butadiene, and then heating the resulting mass including the complex formed between the cuprous chloride and the butadiene to desorption temperatures and condensing the desorbed butadiene and separating the non-condensible gas.

11. A reagent for the vapor phase separation of diolefins from low-boiling hydrocarbon fluids containing the same which comprises a granulated cellulosic fibrous material impregnated with a high-boiling substantially inert oleaginous material, and in intimate admixture with dry powdered cuprous halide, the proportions in said reagent being: from 17 to 73 per cent of said cellulosic material; from 2 to 8 per cent of said oleaginous material; and from 25 to 75 per cent of said cuprous halide.

GRAHAM H. SHORT.
LLOYD C. MORRIS.

---

CERTIFICATE OF CORRECTION.

Patent No. 2,386,274.   October 9, 1945.

GRAHAM H. SHORT, ET AL.

It is hereby certified that error appears in the printed specification of the above numbered patent requiring correction as follows: Page 5, first column, line 6, claim 5, before the syllable "result-" insert --reagent space, heating the--; lines 8 and 9, same claim, strike out "space, heating the reagent"; and that the said Letters Patent should be read with this correction therein that the same may conform to the record of the case in the Patent Office.

Signed and sealed this 29th day of January, A. D. 1946.

Leslie Frazer (Seal)   First Assistant Commissioner of Patents.